United States Patent [19]

Igashira et al.

[11] Patent Number: 4,499,878
[45] Date of Patent: Feb. 19, 1985

[54] FUEL INJECTION SYSTEM FOR AN INTERNAL COMBUSTION ENGINE

[75] Inventors: Toshihiko Igashira, Toyokawa; Taro Tanaka, Nagoya; Yasuyuki Sakakibara, Nishio, all of Japan

[73] Assignee: Nippon Soken, Inc., Nishio, Japan

[21] Appl. No.: 544,417

[22] Filed: Oct. 21, 1983

[30] Foreign Application Priority Data

| Oct. 25, 1982 | [JP] | Japan | 57-187157 |
| Jul. 2, 1983 | [JP] | Japan | 58-119489 |
| Jul. 11, 1983 | [JP] | Japan | 58-124823 |
| Aug. 12, 1983 | [JP] | Japan | 58-146731 |
| Aug. 20, 1983 | [JP] | Japan | 58-152059 |

[51] Int. Cl.³ .................. F02M 51/04; F02M 51/02; F02M 39/02
[52] U.S. Cl. .................................... 123/478; 123/498
[58] Field of Search .............. 123/478, 494, 498; 239/88, 89

[56] References Cited

U.S. PATENT DOCUMENTS

| 4,073,276 | 2/1978 | Nicolls | 123/498 |
| 4,082,481 | 4/1978 | Fenne | 123/498 |
| 4,150,644 | 4/1979 | Masaki et al. | 123/478 |
| 4,175,587 | 11/1979 | Chadwick et al. | 123/478 |
| 4,258,674 | 3/1981 | Wolff | 123/478 |
| 4,351,299 | 9/1982 | Costello | 123/478 |
| 4,359,032 | 11/1982 | Ohie | 123/478 |

Primary Examiner—Raymond A. Nelli
Attorney, Agent, or Firm—Cushman, Darby & Cushman

[57] ABSTRACT

A fuel injection system for an internal combustion engine includes a unit injector for compressing the fuel and injecting a predetermined amount of the fuel and an electronic control device. The unit injector includes a piezoelectric actuator, a piston, and an injection valve. The piezoelectric actuator comprises a columnar laminated body of disk-shaped piezoelectric elements. The laminated body is expanded or compressed in the axial direction of the column according to the application of positive or negative high voltage. The electronic control device controls the frequency of the voltage supplied to the actuator and controls accordingly the amount of fuel injection in accordance with the frequency of the voltage supplied to the actuator.

10 Claims, 26 Drawing Figures

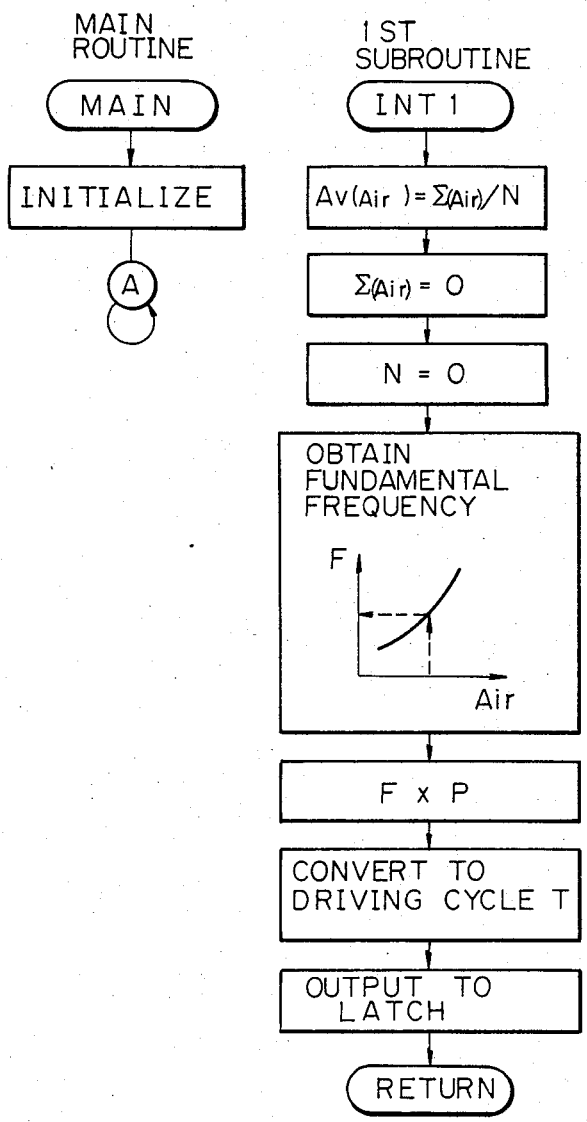

3RD SUBROUTINE

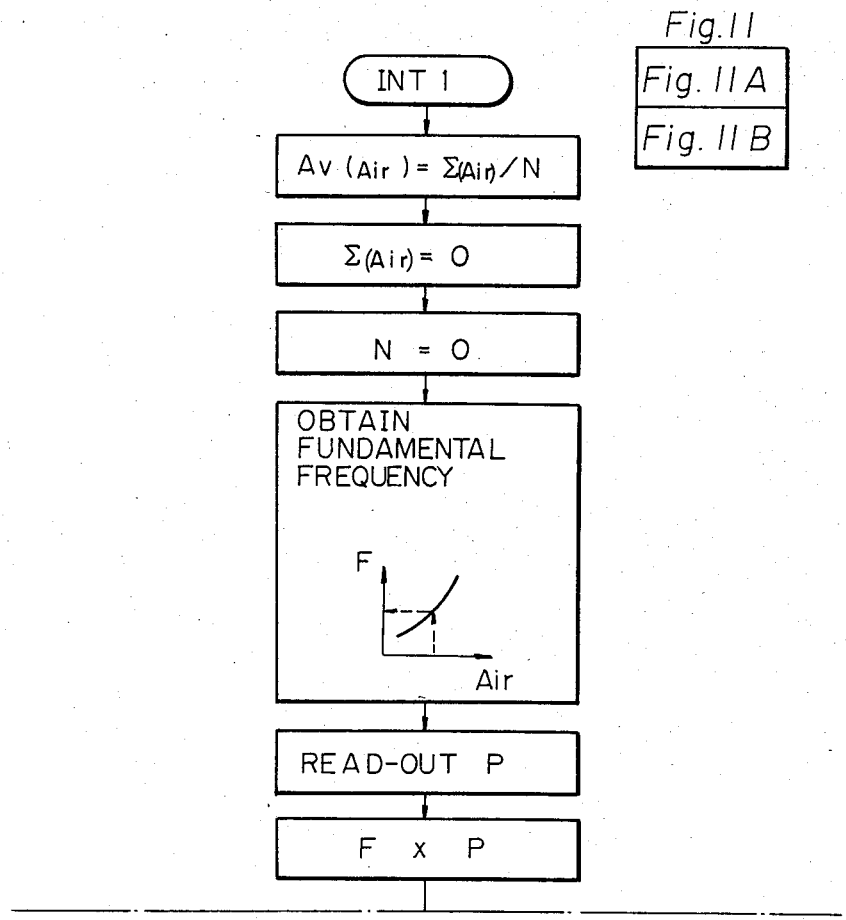

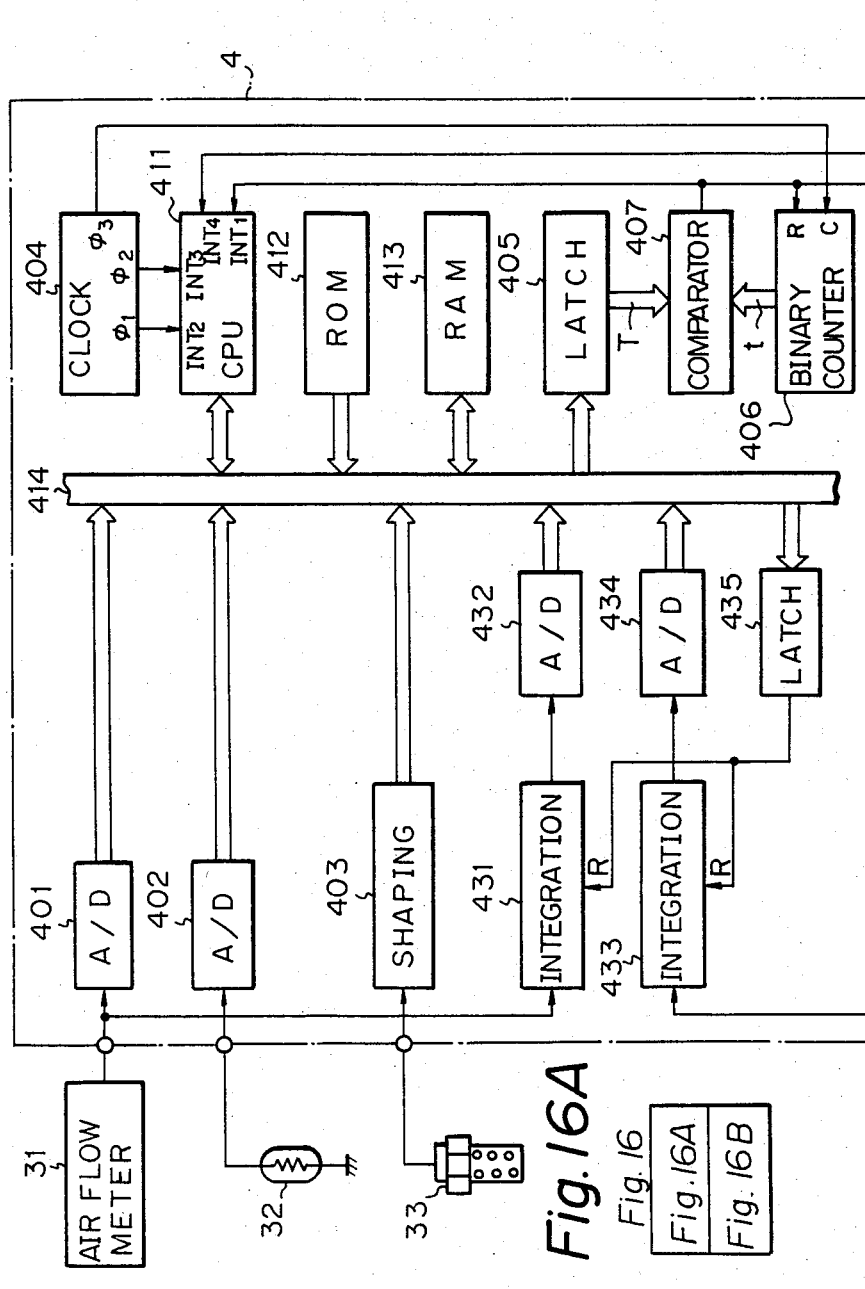

ACTUAL WAVEFORM    TRIANGLE WAVEFORM

4TH SUBROUTINE

FUEL INJECTION SYSTEM FOR AN INTERNAL COMBUSTION ENGINE

BACKGROUND OF THE INVENTION

1. Field of the Invention

The present invention relates to a fuel injection system for injecting fuel into an internal combustion engine and more particularly to a fuel injection system for electronically controlling the amount of fuel injection or the injection quantity.

2. Description of the Prior Art

A conventional system of this type supplies low-perssure fuel to an electromagnetic fuel injector by means of a low-pressure fuel supply device. The only function of the injector is to open/close a nozzle, and, hence, it serves to inject the low-pressure fuel. Since the injection quantity is controlled in accordance with the valve opening time, one injection operation is performed per rotation of the engine.

Since the conventional fuel injection system has the structure described above, it cannot inject high-pressure fuel and has poor fuel vaporization characteristics. Furthermore, since one injection operation is performed per rotation of the engine, uniform mixing of fuel with air cannot be achieved.

SUMMARY OF THE INVENTION

It is an object of the present invention to provide a fuel injection system which injects fuel at a relatively high pressure using a unit injector in which an injection valve and a pump with an expandable electric actuator are coupled with a small distance therebetween, the pump being driven a plurality of times during one cycle so that the injection quantity is controlled in accordance with the number of injection operations per cycle.

According to the fundamental aspect of the present invention, there is provided a fuel injection system for an internal combustion engine having: a unit injector for compressing the fuel and injecting a predetermined amount of the fuel, the unit injector including an actuator adapted to be expanded or compressed with a predetermined stroke in response to a supplied voltage, a piston for taking in fuel to a pump chamber and compressing the taken-in fuel, and an injection valve for injecting the compressed fuel; and an electronic control device for controlling, independently of the rotation of the engine, the frequency of the voltage supplied to the actuator and for controlling accordingly the amount of fuel injection in accordance with the frequency of the voltage supplied to the actuator.

BRIEF DESCRIPTION OF THE DRAWINGS

FIGS. 7A, 7B, 7C, and 7D are flow charts of the operation of the system when the ECU shown in FIG. 5 is used;

FIG. 11a and 11b are a flow chart of tne operation of the system when the ECU shown in FIG. 9 is used;

Fig. 16a and 16b are a block diagram of still another example of an ECU of the system shown in FIG. 1;

DESCRIPTION OF THE PREFERRED EMBODIMENTS

Figure 1:
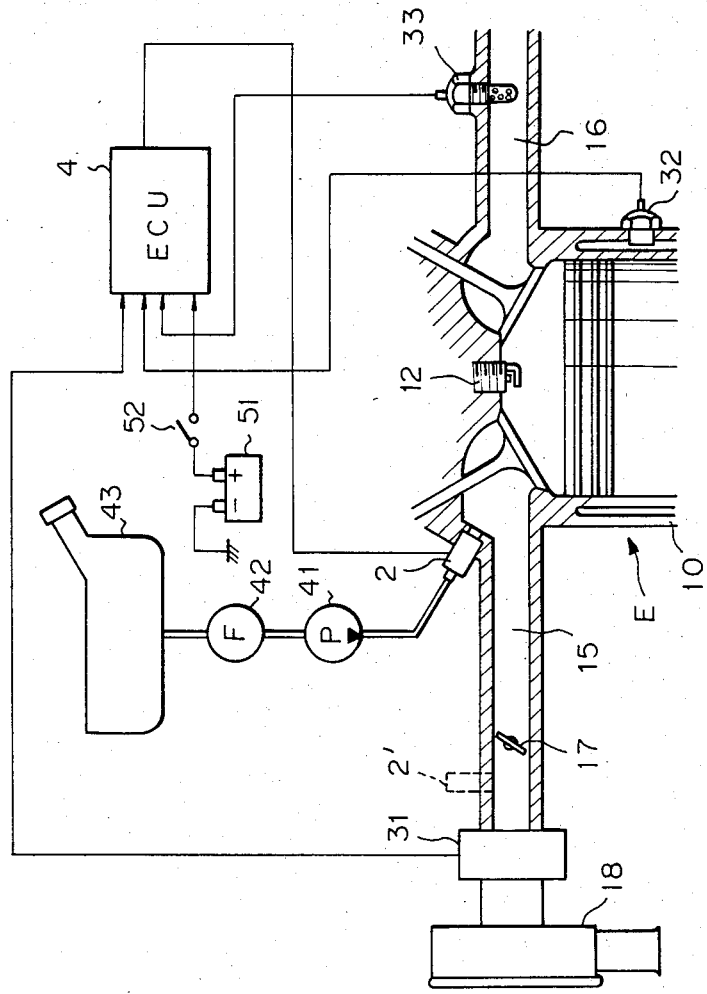
FIG. 1 is a schematic view showing a fuel injection system for an internal combustion engine according to an embodiment of the present invention.

FIG. 1 shows a fuel injection system for an internal combustion engine according to the present invention. Referring to FIG. 1, reference symbol E denotes a four-cycle gasoline internal combustion engine which comprises a cylinder block 10, a piston, an ignition plug 12, an intake valve, an exhaust valve, an intake pipe 15, an exhaust pipe 16, and so on. A throttle valve 17 is arranged in the intake pipe 15. A unit injector 2 is arranged at the intake port.

An air cleaner 18 is mounted on the intake pipe 15, and an air flow meter 31 for measuring the intake air flow rate is arranged downstream of the air cleaner 18. The air flow meter 31 may comprise a hot-wire flow meter which generates an analog voltage proportional to the intake air flow rate.

Fuel from a fuel tank 43 is supplied to the unit injector 2 through a feed pump 41 and a filter 42. The feed pump 41 is of the type that stops operating when the delivery pressure thereof exceeds a preset value. The feed pump 41 may be a diaphragm type or an electromagnetic type. The delivery pressure of the pump 41 is set to be 0.5 kg/cm$^2$. It is also effective to insert a fuel reservoir or an accumulator between the feed pump 41 and the unit injector 2. A water temperature sensor 32 for detecting the cooling water temperature is mounted on the water jacket of the cylinder block 10. The water temperature sensor 32 may comprise, for example, a thermistor.

An oxygen (O$_2$) sensor 33 for generating an electrical signal representing the oxygen concentration in the exhaust gas is arranged in the exhaust pipe 16. The O$_2$ sensor 33 generates a binary signal in accordance with whether the air-fuel ratio A/F is on the lean mixture side or the rich mixture side with reference to the theoretical air-fuel ratio.

Reference numeral 51 denotes a battery and reference numeral 52 denotes an ignition switch.

An electronic control unit (referred to as an ECU hereinafter) 4 processes various output signals from the air flow meter 31, the water temperature sensor 32, the O₂ sensor 33, and the like and controls the unit injector 2 in accordance with the processing result.

Figure 2:
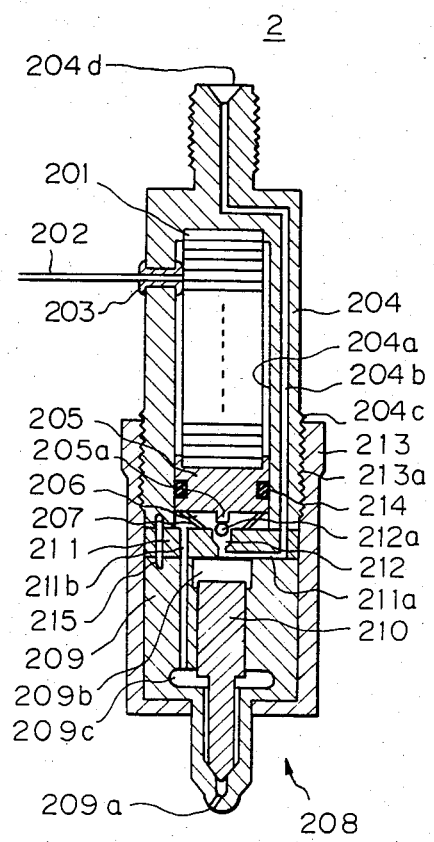
FIG. 2 is a sectional view of a unit injector in the system shown in FIG. 1.

FIG. 2 is a sectional view of the unit injector 2 shown in FIG. 1. The unit injector 2 operates by the expansion/contraction of a piezoelectric actuator 201 and injects fuel accordingly.

The piezoelectric actuator 201 comprises a columnar laminated body of thin disk-shaped elements each having a piezoelectric effect. When a voltage of ±500 V is applied to each element, the element expands about 0.5 μm along the axial direction of the column. Conversely, when a voltage of −500 V is applied to each element, the element contracts by about 0.5 μm. Accordingly, when 100 of such elements are laminated together, a combined expansion/contraction equal to 100 times that of each element can be obtained. Each element comprises a ceramic called PZT, which is obtained by sintering lead zirconium titanate. A voltage is applied to the piezoelectric actuator 201 through a lead wire 202. The lead wire 202 is led to the outside of the unit injector 2 through an upper casing 204 via a grommet 203 and is connected to the ECU 4.

Expansion/contraction of the piezoelectric actuator 201 is directly transmitted to a piston 205, thereby causing it to reciprocate. The piston 205 slides within a cylinder 204a defined within the upper casing 204 so as to expand/contract the volume of a pump chamber 206, thereby providing a pumping operation. A disc spring 207 is arranged in the pump chamber 206 and biases the piston 205 in the contracting direction of the actuator 201. When the pump chamber 206 contracts, fuel inside the pump chamber 206 is compressed to a high pressure and is supplied to an injection valve 208. The high-pressure fuel supplied to the injection valve 208 is injected from a nozzle 209a.

The injection valve 208 consists of a nozzle body 209 and a needle valve 210. The needle valve 210 has a stepped shape comprising a small and a large diameter portion. The distal end of the needle valve 210 opens/closes the seat of the nozzle body 209. Fuel pressure in a back pressure chamber 209b supplied by the feed pump 41 acts on the end face of the large diameter portion of the 12 needle valve 210 in such a manner that the needle valve 210 closes the nozzle 209a. Fuel supplied to the back pressure chamber 209b of the nozzle body 209 is supplied through a fuel inlet 204d of the upper casing 204, a fuel path or channel 204b formed in the wall defining the upper casing 204, and a fuel path 211a defined in a distance piece 211.

The distance piece 211 separates the pump chamber 206 from the injection valve 208. The distance piece 211 has a fuel path 211b communicating the pump chamber 206 with a fuel chamber 209c. The fuel chamber 209c is defined within the nozzle body 209, and the fuel pressure at the stepped portion of the needle valve 210 serves to open the nozzle 209a. Thus, in the normal state, the needle valve 210 closes the nozzle 209a. However, when the volume of the pump chamber 206 is decreased, the needle valve 210 is raised to open the nozzle 209a.

When the volume of the pump chamber 206 increases, fuel is drawn into the pump chamber 206 from the fuel path 211a through a ball-type check valve 212. The check valve 212 is arranged in the distance piece 211. A projection 205a of the piston 205 serves as a stopper for preventing a steel ball 212a serving as a valve plug from fully entering the pump chamber 206.

The upper casing 204, the distance piece 211, and the nozzle body 209 are of the same diameter, are stacked in the order named, and are pressed and securely fixed along the axial direction in a cap nut-like lower casing 213. A female thread 213a of the lower casing 213 and a male thread 204c of the upper casing 204 mesh with each other. Reference numeral 214 denotes an O-ring, and reference numeral 215 denotes a knock pin.

The amount of fuel delivered per operation of the unit injector 2 is determined by the stroke of the piezoelectric actuator 201, which is, in turn, determined by the driving voltage applied. An injection quantity or amount q per injection operation and a driving voltage Vd hold a substantially linear relationship.

Figure 3:
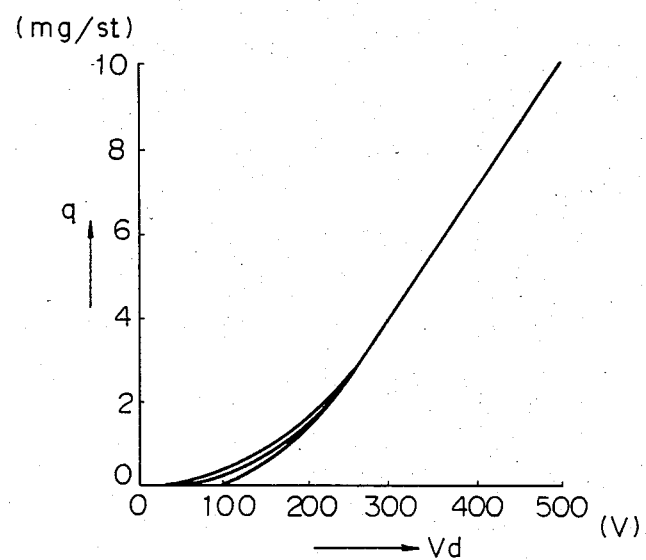
FIGS. 3 and 4 are graphs showing the operation characteristics of the unit injector shown in FIG. 2.

FIG. 3 shows the relationship between the injection quantity q and the driving voltage Vd. Referring to FIG. 3, the driving voltage Vd (V) is plotted along the axis of the abscissa and the injection quantity q (mg/st) is plotted along the axis of the ordinate. The driving voltage and the injection quantity are linear within a region wherein the driving voltage is about 300 V or higher. When the driving voltage is less than 300 V, the injection quantity is unstable. On the other hand, when the driving voltage exceeds 500 V, a fashover may occur in the direction of thickness of the piezoelectric element. In view of this, the driving voltage is preferably within the range of 300 to 500 V.

Figure 4:
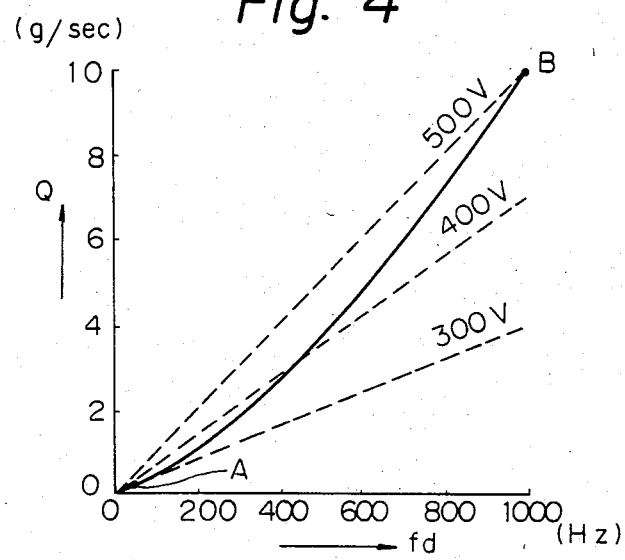

FIG. 4 shows the relationship between an injection quantity Q per unit time and a driving frequency fd of the unit injector 2. In FIG. 4, the driving frequency fd (Hz) is plotted along the axis of the abscissa, and the injection quantity Q (g/sec) is plotted along the axis of the ordinate. The injection quantity Q is given as a product of the injection quantity q per injection operation and the driving frequency fd. The injection quantity vs. the driving frequency characteristics is shown by the dotted curves when the driving voltage as a parameter is 300 V, 400 V, and 500 V, respectively.

The mode of operation of the system shown in FIG. 1 will now be described.

In response to an output signal from the air flow meter 31, the ECU 4 calculates a fundamental frequency (Hz) proportional to the intake air flow rate (g/sec). The calculated fundamental frequency is corrected in accordance with output signals from the water temperature sensor 32 and the O₂ sensor 33. The piezoelectric actuator 201 of the unit injector 2 is driven at the corrected frequency independently of the engine rotation. That is, the piezoelectric actuator 201 is driven by the number of times per second corresponding to the corrected frequency.

Correction of the fundamental frequency is performed in the following manner.

When a signal from the water temperature sensor 32 indicates a cooling water temperature of 60° C. or lower, the fundamental frequency is incremented in increments of 0.2 Hz in accordance with a decrease in the detected temperature in unitary decrements from 60° C. When a lean signal is received from the O₂ sensor 33 and the signal from the water temperature sensor 32 indicates a cooling water temperature of 60° C. or lower, correction of the fundamental frequency in accordance with the output signal from the $O_2$ sensor 33 is not performed. In order to perform such correction, predetermined amount increase ratio data is set in accordance with the water temperature scale, and the amount increase ratio data is stored in the read-only memory (ROM) of the ECU 4. Then the ECU 4 accesses the amount increase ratio corresponding to the water temperature detected by the water temperature sensor 32 and multiplies the basic frequency by the amount increase ratio. The ECU 4 drives the unit injector 2 at a frequency which has been corrected for a variation in water temperature. For example, the amount increase ratio at a water temperature of 20° C. is set as 1.5, and the unit injector 2 is driven at a frequency which is a product of the fundamental frequency and 1.5. When the water temperature exceeds 60° C., the warming-up period of the engine E is considered to have ended, and correction in accordance with the detected water temperature is no longer performed. Instead, correction is performed in accordance with an output signal from the $O_2$ sensor 33.

Correction of the fundamental frequency in accordance with an output signal from the $O_2$ sensor 33 is performed by incrementing/decrementing a correction coefficient p for multiplication by the fundamental frequency in accordance with a lean or rich state. When the output signal from the $O_2$ sensor 33 indicates a rich mixture, the correction coefficient is decremented in decrements of, for example, 0.04/sec. Conversely, when the output signal from the $O_2$ sensor 33 indicates a lean mixture, the correction coefficient is incremented in increments of, for example, 0.06/sec. When the fundamental frequency is multiplied by such a correction coefficient, the driving frequency is gradually decreased in response to a rich signal so that the air-fuel ratio A/F changes toward that of a lean mixture. On the other hand, the driving frequency is gradually increased in response to a lean signal so that the air-fuel ratio changes toward that of a rich mixture. In this manner, correction can be continuously performed so that the air-fuel ratio constantly approximates the theoretical air-fuel ratio.

Figure 5:
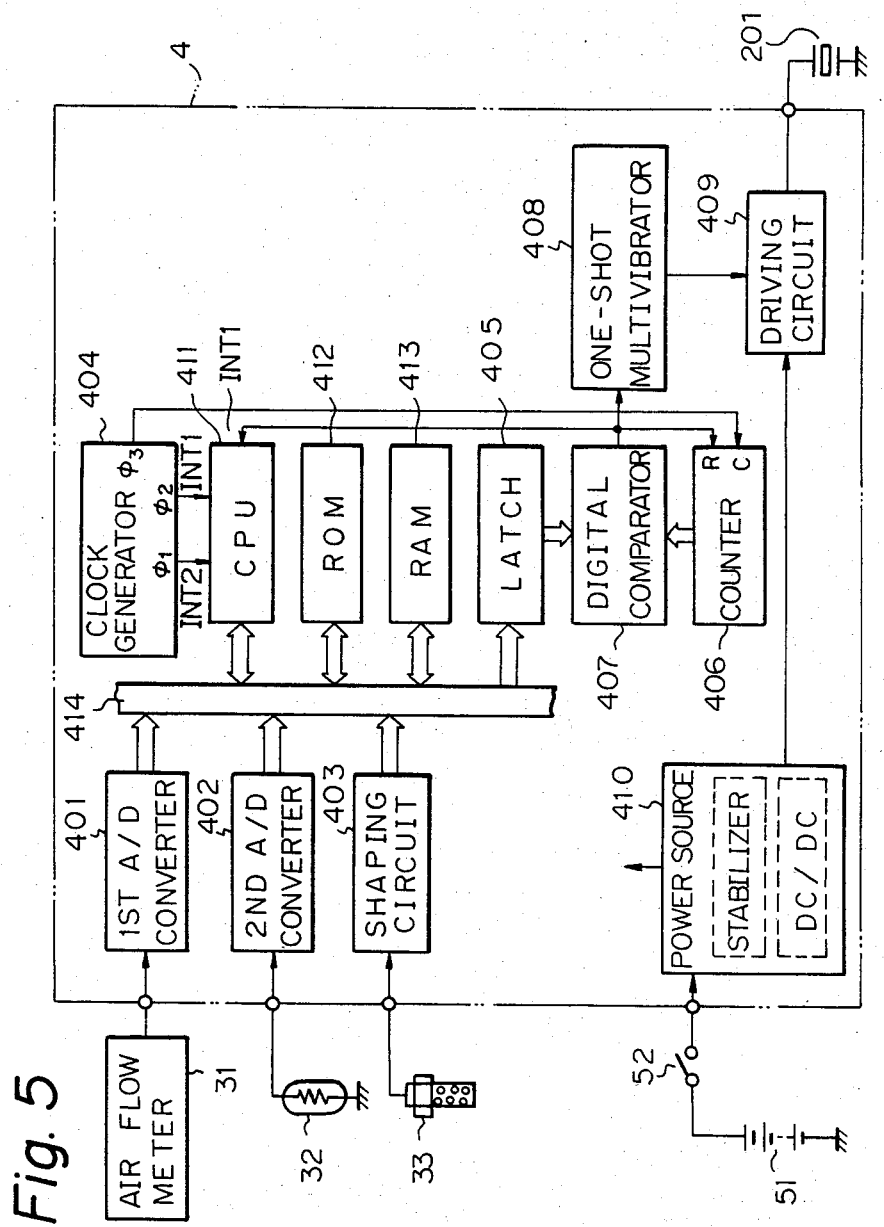
FIG. 5 is a block diagram showing an example of an electronic control unit (ECU) in the system shown in FIG. 1.

FIG. 5 is a block diagram showing the configuration of the ECU 4. The ECU 4 basically comprises a microcomputer system. A first A/D converter 401 A/D converts an output signal from the air flow meter 31 into a 16-bit digital signal which is supplied onto a bus line 414. A second A/D converter 402 A/D converts an output signal from the water temperature sensor 32 into a 16-bit digital signal which is supplied onto the bus line 414. A shaping circuit 403 compares an output signal from the $O_2$ sensor 33 with a predetermined reference level for shaping it. When the oxygen concentration in the exhaust gas is high, the shaping circuit 403 generates a lean signal of level "0". When the oxygen concentration in the exhaust gas is low, the shaping circuit 403 generates a rich signal of level "1". The lean or rich signal from the shaping circuit 403 is also supplied onto the bus line 414.

A clock generator 404 generates clock signals $\phi 1$, $\phi 2$, and $\phi 3$ of stable frequencies. The clock signals $\phi 1$, $\phi 2$, and $\phi 3$ have frequencies of, for example, 1 khz, 100 kHz, and 500 kHz, respectively. The clock signal $\phi 1$ is connected to an interrupt input INT2 of a central processing unit (CPU) 411 (described later), and the clock signal $\phi 2$ is connected to an interrupt input INT3 of the CPU 411. A 16-bit latch 405 latches a unit injector driving cycle or drive perod T calculated in the CPU 411. A 16-bit binary counter 406 receives at its reset input R a comparison output from a 16-bit digital comparator 407 (described later) and at its clock input C the clock signal $\phi 3$ from the clock generator 404. The contents of the binary counter 406 indicate the time elapsed since the generation of the preceding output signal from the digital comparator 407. This time is designated by the symbol t.

The 16-bit digital comparator 407 compares the unit injector driving cycle T from the latch 405 with the output t from the binary counter 406. When $t \geq T$, the digital comparator 407 generates a signal of level "1". The output signal from the digital comparator 407 is supplied to an interrupt input INT1 of the CPU 411 and to a one-shot multivibrator 408.

Since the duration of the output signal from the digital comparator 407 is short, the one-shot multivibrator 408 widens it to a predetermined time interval, for example, 400 μsec. A driving circuit 409 applies to the piezoelectric actuator 201 of the unit injector 2 a voltage of +500 V when the signal from the one-shot multivibrator 408 is at level "1" and a voltage of −500 V when the signal from the one-shot multivibrator 408 is at level "0". A power source 410 comprises a stabilizer which stabilizes power supplied from the battery 51 through a key switch 52 and a DC/DC converter which applies high voltages of ±500 V to the driving circuit 409 for driving piezoelectric actuator 201.

The 16-bit CPU 411 receives the output signal from the digital comparator 407 at its interrupt input INT1, the clock signal $\phi 1$ at its interrupt input INT2, and the clock signal $\phi 2$ at its interrupt input INT3, as was previously described. The priority order of the interrupts is INT1, INT2, and INT3. A ROM 412 stores a program and data, and a random-access memory (RAM) 413 is provided for CPU operation. The CPU 411 calculates the fundamental frequency for driving the unit injector 2 on the basis of the intake air flow rate from the air flow meter 31, corrects the fundamental frequency in accordance with the outputs from the water temperature and $O_2$ sensors, and supplies the corrected frequency to the latch 405.

Figure 6:
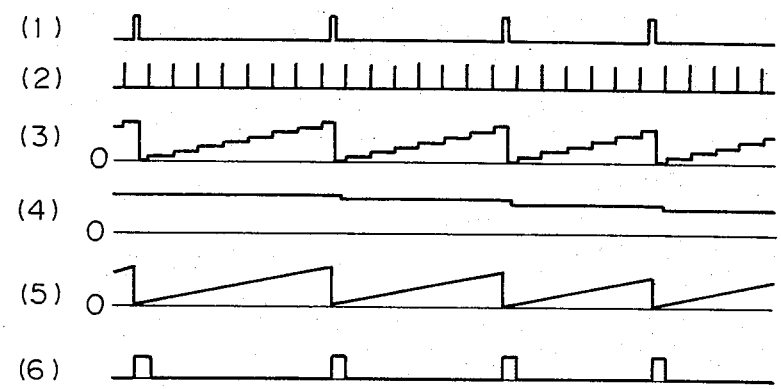
FIG. 6 shows the waveforms of signals at the respective parts of the ECU shown in FIG. 5.
Figure 8:
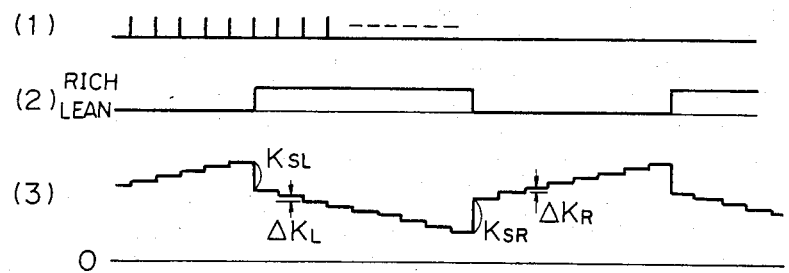
FIG. 8 shows the waveforms of signals in the flow charts shown in FIGS. 7A to 7D.

The mode of operation of the ECU 4 having the configuration described above will now be described. FIG. 6 is a timing chart showing states at respective parts of the circuit. FIG. 6 shows the waveforms of the following signals:

(1) digital comparator output
(2) clock signal $\phi 1$
(3) $\Sigma$(Air) content
(4) T contents
(5) t contents
(6) driving signal FIGS. 7A to 7D are flow charts of the program. FIG. 8 is a timing chart corresponding to the flow charts shown in FIGS. 7A to 7D. FIG. 8 shows the waveforms of the following signals:

(1) clock signal $\phi 2$
(2) $O_2$ sensor rich signal
(3) correction coefficient value When the key switch 52 is turned ON, power is supplied to the ECU 4 from the battery 51. Then predetermined power is supplied from the power source 410 to the controller and the driving circuit 409. When the power source is ON, each interrupt subroutine is prohibited, and the MAIN routine shown in FIG. 7A alone can be initialized. In the MAIN routine, initialization, such as interrupt enable, setting of various preset values, and so on, is performed. Thereafter, the flow enters the idle loop.

The operation state of the system will now be considered. The second subroutine shown in FIG. 7C has priority of INT2 and is started in response to the clock signal $\phi_1$ (FIG. 6(2)) of 1 kHz frequency. The data of the intake air flow rate is read in from the first A/D converter. This data indicates the intake air flow rate when the second subroutine is started. As is well known, the intake air flow pulsates in accordance with each stroke of the engine. For this reason, the average value of the intake air flow rate must be calculated. The data of the intake air flow rate read in the second subroutine is integrated and the integrated value is stored in the RAM. The integrated value is indicated as $\Sigma$Air (FIG. 6(3)). At the same time, an integration number N is also incremented by 1 every time the second subroutine is started. The data N is used for obtaining the average value of the intake air flow rate. The data $\Sigma$Air and N is initialized in the first subroutine (described later). Thereafter, the second subroutine returns to the MAIN routine and is ended.

Figure 7D:
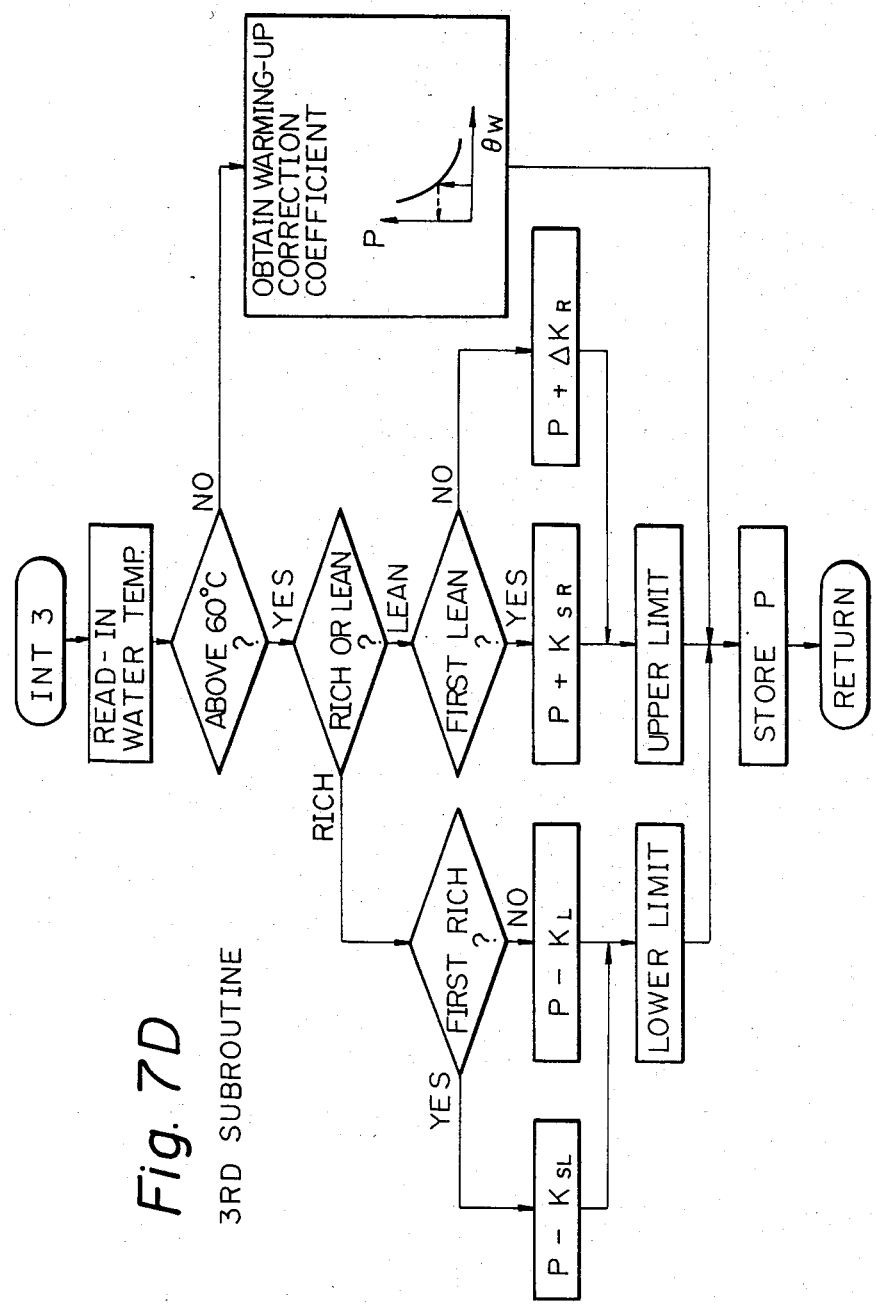

The third subroutine shown in FIG. 7D has a priority order of INT3 and is started by the clock signal $\phi_2$ (FIG. 8(1)) having a frequency of 100 kHz. First, the water temperature is read in from the second A/D converter. Next, it is discriminated if the read-in water temperature is 60° C. or higher. If NO, correction of the fundamental frequency is performed in accordance with a water temperature for a warming-up period. For this purpose, the amount increase ratio corresponding to each water temperature which is determined experimentally is stored in the ROM. The amount increase ratio is then calculated by interpolation on the basis of the read-in water temperature data. The calculated value is stored as a correction coefficient p in the RAM and the flow returns to the MAIN routine. When the read-in water temperature is 60° C. or higher, this correction is not performed since the warming-up period has been completed. Instead, an air-fuel ratio feedback is performed in accordance with an output signal from the $O_2$ sensor 33. According to this method, the correction coefficient for multiplication of the fundamental frequency is incremented/decremented in accordance with the rich/lean signal (FIG. 8) from the $O_2$ sensor 33.

The output signal from the $O_2$ sensor 33 indicating a rich or lean state of the exhaust gas is read in through the shaping circuit 403. When the signal indicates a first rich state, a preset skip amount $K_{SL}$ is subtracted from the correction coefficient p to obtain $p-K_{SL}$. In any subsequent rich state, the correction coefficient p is decremented by a selected ratio $\Delta K_L$. For example, if the ratio is selected to be 0.04/sec, $K_L$ for the interrupt frequency 100 Hz of INT3 is calculated to be $\Delta K_L = 0.0004/10$ msec. Accordingly, every time a rich state is detected in the third subroutine, the correction coefficient is decremented by $\Delta K_L$ to obtain $p-\Delta K_L$. Conversely, when the signal from the $O_2$ sensor 33 indicates a lean state, it is checked if the lean state is the first lean state. If YES, a skip amount $K_{SR}$ is added to the correction coefficient p to obtain $p+K_{SR}$. If NO, the correction coefficient p is incremented by a selected ratio $\Delta K_r$. For example, if the ratio is selected to be 0.06/sec, $\Delta K_r$ is 0.006/10 msec. Accordingly, every time a lean state is detected, the correction coefficient p is incremented by $\Delta K_R$. This flow is shown in FIG. 8(3).

Although not shown in the flow chart, when the temperature of the $O_2$ sensor 33 is low and has not yet been activated or a fuel cut is performed by engine braking or the like, the rich or lean state may continue for a considerably long period of time. In such a case, upper and lower limits of the correction coefficient p may be present. The correction coefficient is limited to falling within the range defined by these upper and lower limits. Futhermore, when the rich or lean state continues for a time period exceeding a predetermined time period, the correction coefficient can be forcibly returned to 1.0 or another suitable value. At the end of the third subroutine, the obtained connection coefficient p is stored in the RAM. The first subroutine shown in FIG. 7B will now be described. The first subroutine corresponds to the priority order of INT1 and is started in response to each output from the digital comparator 407, that is, every time the piezoelectric actuator is driven. In the first subroutine, the average value of the intake air flow rate is calculated. The fundamental frequency is calculated in accordance with the calculated average value of the intake air flow rate. The fundamental frequency is corrected, and the corrected frequency is produced.

In the first step in the first subroutine, the $\Sigma$Air and the integration number N are read out from the RAM. Then $Av(Air) = \Sigma(Air)/N$ is calculated. The term Av-(Air) corresponds to the average intake air flow rate between the preceding driving signal and the current driving signal (INT1). Thereafter, in preparation for the next integration operation, the data $\Sigma(Air)$ and N is cleared to 0. Next, the current fundamental frequency F is obtained from the average intake air flow rate independently of the rotation of the engine.

For this purpose, an experimentally determined fundamental frequency E coresponding to each intake air flow rate is stored in the ROM in the form of a map. The current fundamental frequency F is calculated by interpolation based on the preceding intake air flow rate data Air. Then the fundamental frequency F is corrected in accordance with the correction coefficient p which is calculated in the third subroutine. The corrected frequency is obtained by reading out correction coefficient p stored in the RAM and then multiplying the fundamental frequency F by the correction coefficient p.

Finally, the obtained driving frequency is converted into the driving cycle, that is, into a pulse number T of the clock signal $2\phi$ for the binary counter 406. The pulse number T is then produced and the flow returns to the MAIN routine. Thereafter, the digital comparator 407 compares the output singal t from the binary counter 406 with the contents T of the latch 405. When $t = \geq T$, the digital comparator 407 automatically produces a driving signal. The driving signal is converted to voltages of $\pm 500$ V by the driving circuit 409 so as to drive the piezoelectric actuator 201 independently of the rotation of the engine.

Figure 9:
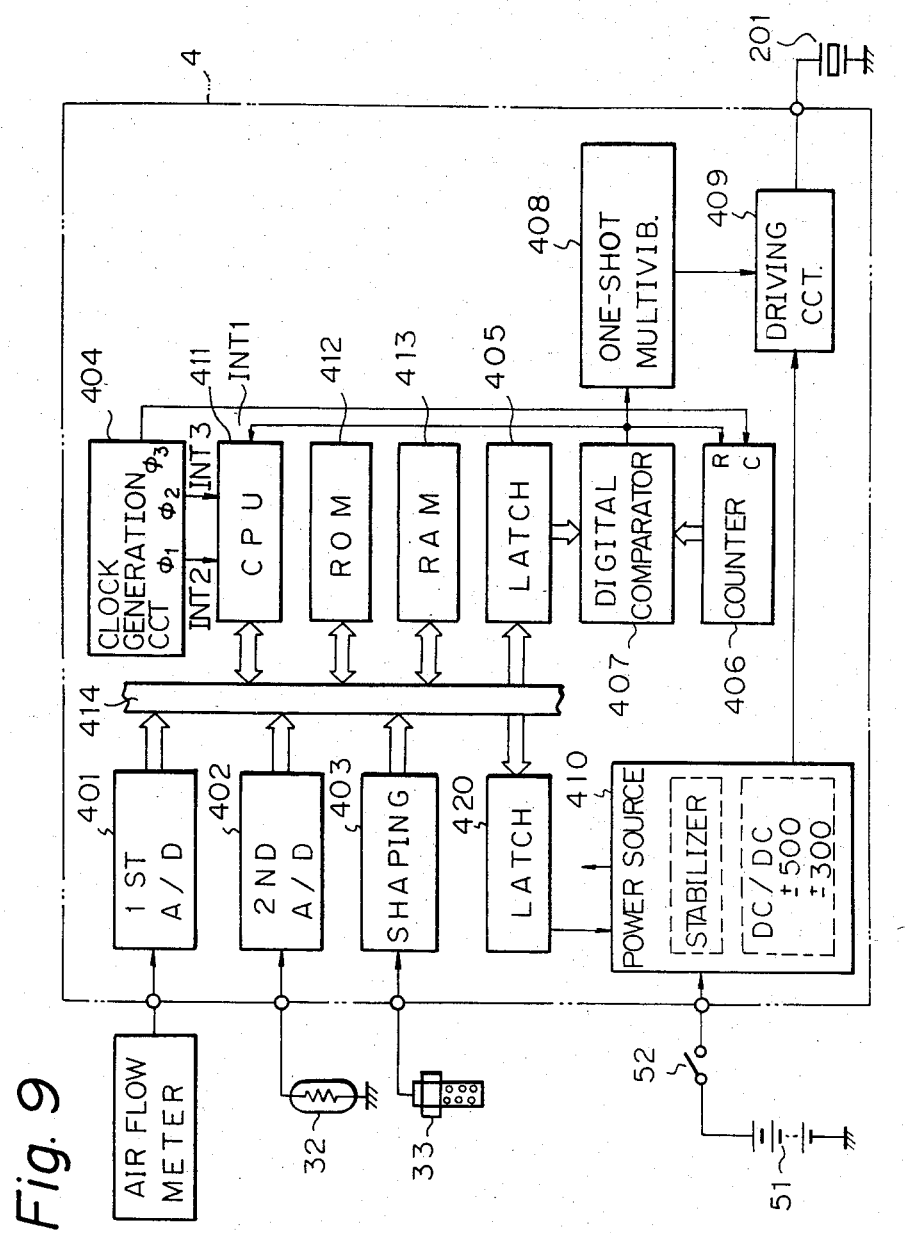
FIG. 9 is a block diagram of another example of an ECU in the system shown in FIG. 1.

In the embodiment which uses the ECU shown in FIG. 5, the injection quantity is controlled in accordance with only the driving frequency (the number of injection operations per second) of the piezoelectric actuator independently of the rotation of the engine. However, the driving frequency may be controlled in accordance with both the driving frequency and the driving voltage. In this case, an ECU as is shown in FIG. 9 is used. Referring to FIG. 9, a latch 420 is added to the ECU 4. A DC/DC converter for generating voltages of ±300 V and ±500 V is arranged for the power source 410.

The 1-bit latch 420 produces a signal corresponding to the driving voltage level calculated by the CPU 411. The level "0" of the signal from the latch 420 indicates ±300 V and the level "1" thereof indicates ±500 V. The signal from the latch 420 is connected to the power source 410 and switches the high voltage to be supplied therefrom between ±300 V and ±500 V in accordance with the level "0" or "1". This switching may be achieved by preparing power sources of ±300 V and ±500 V and switching between these power sources by means of a switch. Alternatively, voltages of ±300 V and ±500 V may be generated by switching the and reference voltage of a stabilized power source. The switching time is selected to be within 1 msec since the maximum value of the driving frequency is 1,000 Hz.

Figure 10:
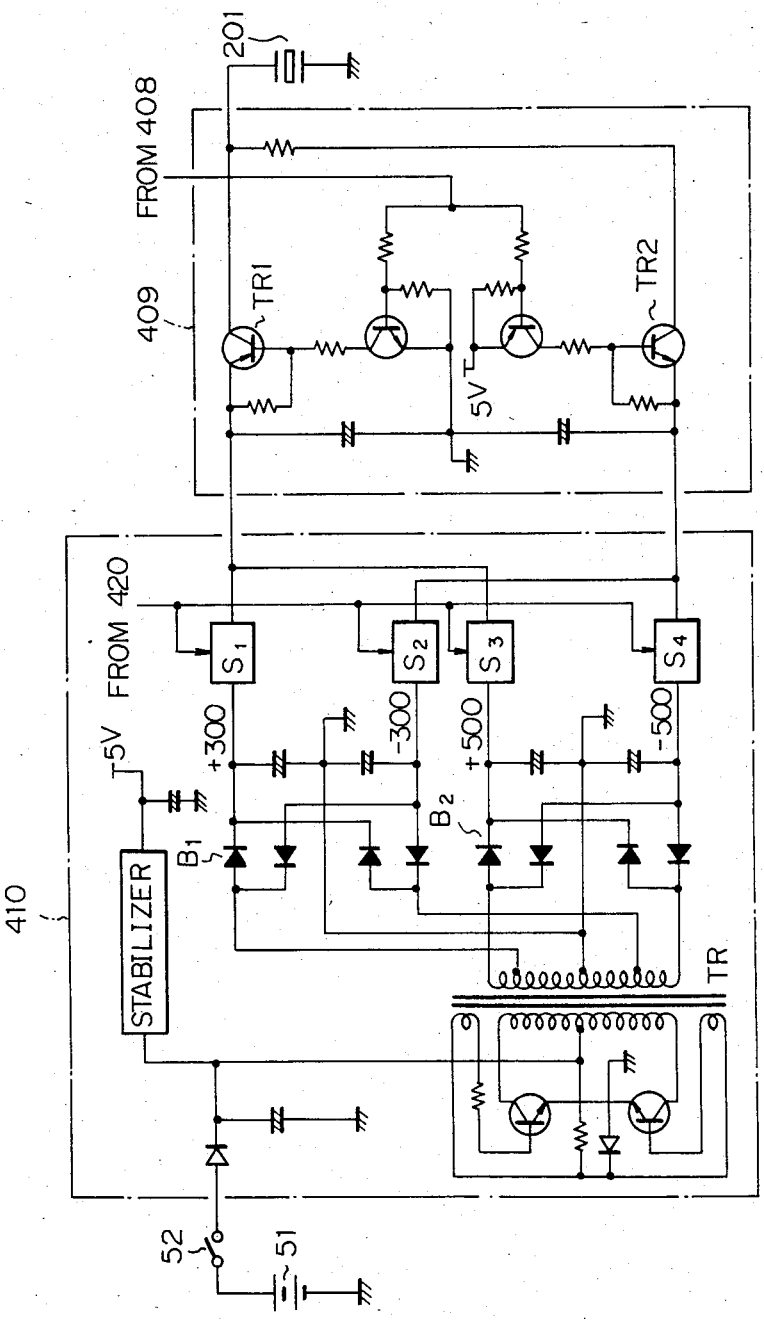
FIG. 10 is a circuit diagram of a power source and a driving circuit in the ECU shown in FIG. 9.

FIG. 10 shows an example of the driving curcuit 409 and the power source 410. The driving circuit 409 comprises a high-voltage resistant transistor circuit. When a signal of level "1" is received from the one-shot multivibrator 408, a transistor TRI is turned on. A voltae of +300 V or +500 V is applied to the piezoelectric actuator 201. When a signal of level "0" is received from the one-shot multivibrator 408, a transistor TR2 is turned on. Then a voltage of −300 V or −500 V is applied to the piezoelectric actuator 201. The power source 410 includes a stabilizer for obtaining a constant voltage of 5 V and also includes a DC/DC converter which consists of a transistor chopper circuit, a boosting transformer TR, two diode bridge circuits B1 and B2, and switching circuits S1 to S4. When an output signal from the latch 420 is at logic level "0", the circuits S1 and S2 are turned on while the circuits S3 and S4 are turned off. Then voltages of +300 V are applied from the bridge circuit B1 to the driving circuit 409. On the other hand, if the output signal from the latch 420 is "1", the circuits S1 and S2 are turned off and the circuits S3 and S4 are turned on. Then voltages of ±500 V are produced from the bridge circuit B2.

Figure 11B:
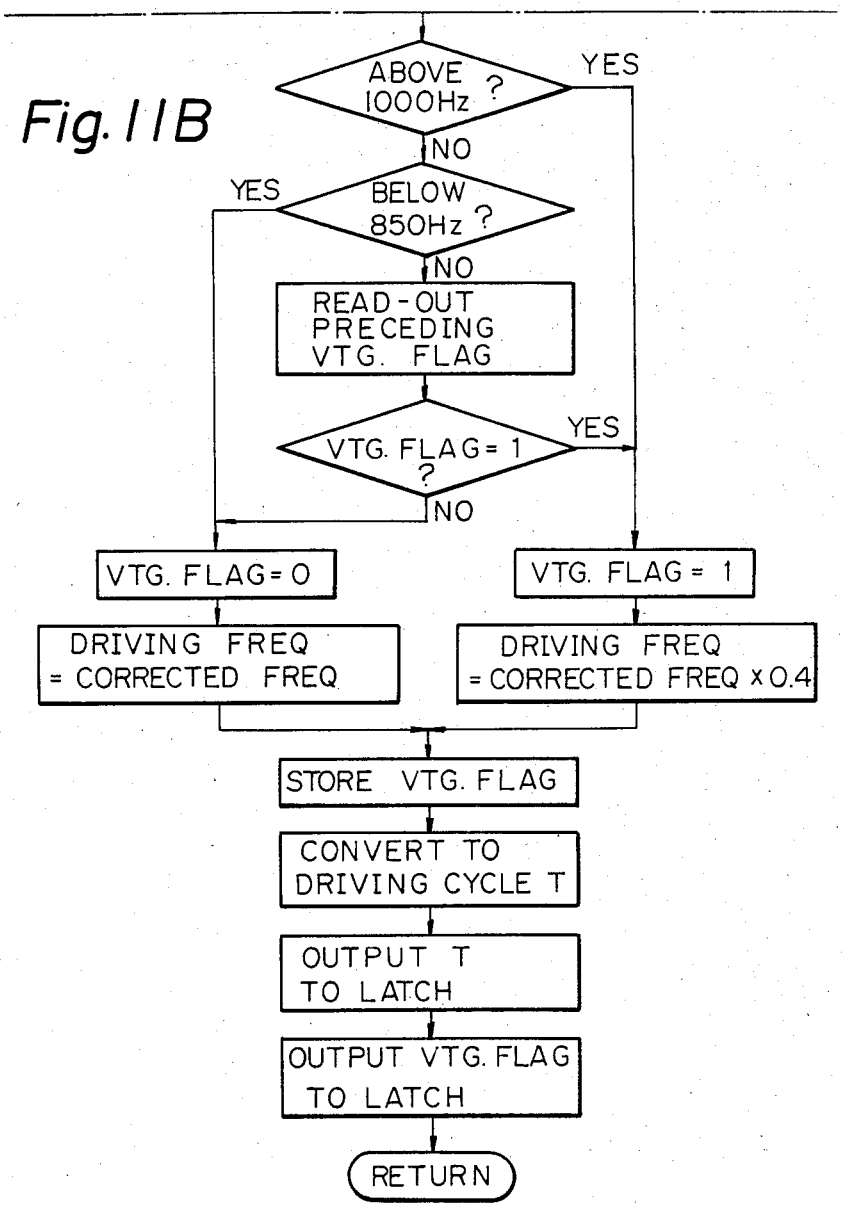

In this case, the CPU 411 executes a program in accordance with the first subroutine as is shown in FIG. 11. In accordance with the same procedures as in the first embodiment, a corrected frequency (F×p) is obtained.

Subsequently, the driving voltage and frequency are calculated in accordance with the corrected frequency. A description will be made with reference to a case wherein a first discrimination level of the driving voltage is 1,000 Hz. First, it is checked if the corrected frequency is higher than 1,000 Hz.

If the corrected frequency is higher than 1,000 Hz, it is higher than the allowable driving frequency. Therefore, the driving voltage is switched to 500 V so as to reduce the driving frequency. When the driving voltage is switched from 300 V to 500 V, the injection quantity per injection operation increases from 4 mg to 10 mg. Then the driving frequency is set to be 0.4 (the inverse value of the ratio of 4:10 mg) times the original driving frequency so that injection quantity per unit time can be set to be the same. When the corrected frequency is higher than 1,000 Hz, a voltage flag is set at "1" (500 V mode) to calculate:

driving frequency=0.4×corrected frequency

When the corrected frequency is lower than 1,000 Hz, it is further checked if the corrected frequency is lower than 850 Hz. The frequency 850 Hz is the second discrimination level. A difference of 150 Hz between the first discrimination level and the second discrimination level (1,000 Hz and 850 Hz, respectively,) is the hysteresis range. Thus, the same driving voltage mode may be maintained for a small change in the injection quantity so that frequent unnecessary switching of the driving voltage and frequency may be prevented.

When the corrected frequency is lower than 850 Hz, the voltage flag is set at level "0" (300 V mode) so that the driving frequency equals the corrected frequency.

When the corrected frequency falls within the range between 850 Hz and 1,000 Hz, it is within the hyteresis range. Accordingly, either the 300 V mode or the 500 V mode may be taken. However, the current mode in this case is determined in accordance with the preceding mode. In this case, the voltage flag of the preceding mode is read out from the RAM. It is checked if the readout voltage flag is at level "1" or "0". If it is at level "1", the current voltage flag is set at level "1" and the driving frequency is set to be 0.4 times the corrected frequency. However, if the readout voltage flag is at level "0", the current voltage flag is set at level "0" and the driving frequency is set to equal the corrected frequency. Thus, the hysteresis effect can be obtained within the hysteresis range as described above.

The voltage flag and the driving frequency are obtained in the manner described above. The voltage flag is stored in the RAM and is also supplied to the latch 420. The driving frequency is converted into the driving cycle or period T corresponding to the clock signal φ3 (500 kHz), which is suppled to the latch 420. The flow then returns from the INT1 routine to the MAIN routine. Thereafter, the digital comparator 407 compares the output t from the binary counter 406 with the contents T of the latch 405. When t≧T, the digital comparator 407 automatically generates a driving signal. The signal is converted into pulses of constant pulse widths (400 μsec) by the one-shot multivibrator 408 and drives the piezoelectric actuator 201 by the driving voltage indicated by the voltage flag.

In this manner, when the intake air flow rate is small and the fuel injection quantity is small, the driving voltage is decreased to maintain the driving frequency above its lower limit. Conversely, when the intake air flow rate is large and the injection quantity is also large, the driving voltage is lowered and the driving frequency is maintained below its upper limit. Thus, the driving frequency fd (number of injection strokes) of the unit injector 2 can be kept within a safe range.

Figure 12:
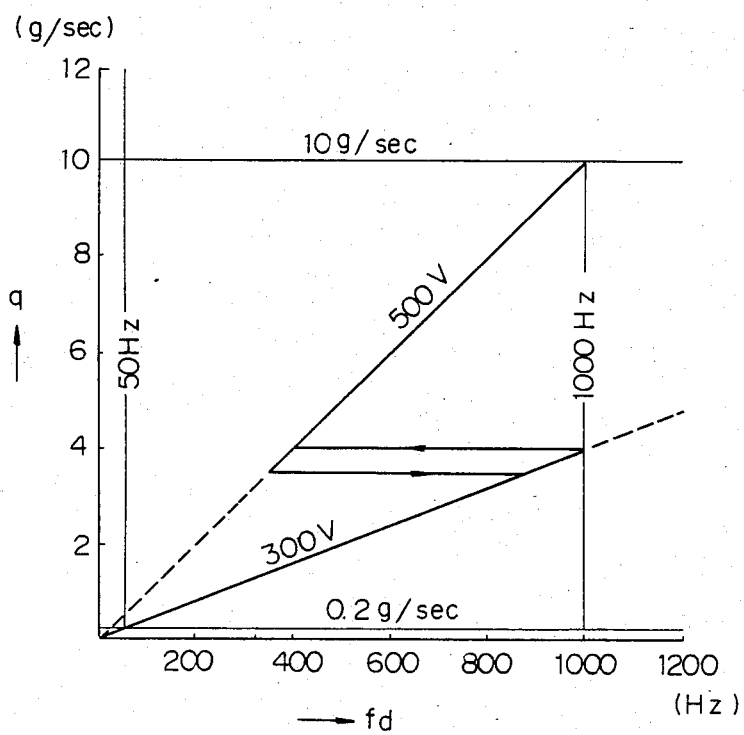
FIG. 12 is a graph showing the switching characteristics of a driving voltage.

FIG. 12 is a graph showing the switching operation described above. The driving frequency fd (Hz) is plotted along the axis of the absicissa and the injection quantity q (g/sec) is plotted along the axis of the ordinate. Referring to FIG. 12, when the driving frequency is 1,000 Hz, the driving voltage 300 V is switched to 500 V. Upon this switching, the driving frequency is reduced to 400 Hz.

In the embodiment using the ECU shown in FIG. 9, the driving voltage is switched in two steps. However, the driving voltage can be continuously changed. For this purpose, the following method is adopted. According to this method, point A, at which the driving voltage is 300 V, the driving frequency is 50 Hz, and the injection quantity is 0.2 g/sec, and point B, at which the driving voltage is 500 V, the driving frequency is 1,000 Hz, and the injection quantity is 10 g/sec, are connected by a line. The driving frequency and voltage are continuously increased in accordance with the obtained line with an increase in the injection quantity. When this method is adopted, the injection quantity is changed smoothly, and the drivability is not impaired.

Another method may also be adopted. According to this method, a circular arc is suitably selected, having the line connecting the points A and B as an upper chord. Then the driving frequency and voltage can be controlled in accordance with the obtained curve. In the first method described above wherein the driving voltage and frequency are controlled in accordance with a line, the increase in the driving frequency is linear. However, the increase in the driving voltage with an increase in the injection quantity draws a sharp curve wherein the rate of change in the driving voltage is great within a region of a small injection quantity. Accordingly, it is difficult to control the driving voltage in the region of a small injection quantity.

In order to solve this problem and to change the driving voltage and frequency at the same rate, the driving voltage and frequency can be changed at a ratio of ½ power of the rate of change of the injection quantity. However, in practice, as in the second method, a circular arc having a line connecting the points A and B as an upper chord can be selected. Then the driving frequency and voltage can be controlled according to the arc.

Figure 13:
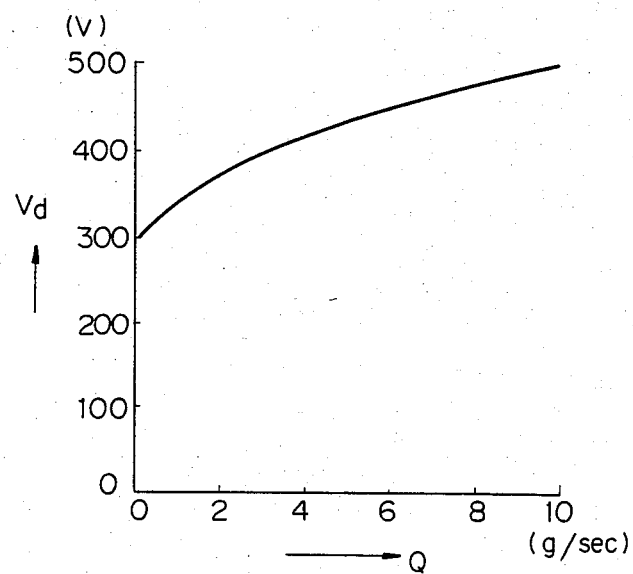
FIG. 13 is a graph showing a driving voltage as a function of a supplied fuel quantity.
Figure 14:
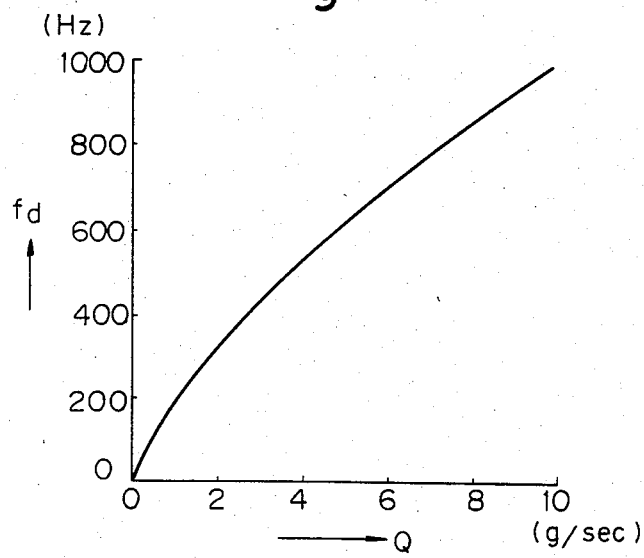
FIG. 14 is a graph showing a driving frequency as a function of a supplied fuel quantity.

When the curve or arc connecting the points A and B as is shown in FIG. 4 is adopted, the driving voltage and the injection quantity hold the relationship as shown in FIG. 13. The driving frequency and the injection quantity hold the relationship as shown in FIG. 14. Referring to FIG. 13, the injection quantity Q (g/sec) is plotted along the axis of the abscissa and the driving voltage Vd (V) is plotted along the axis of the ordinate. Referring to FIG. 14, the injection quantity Q (g/sec) is plotted along the axis of the abscissa and the driving frequency fd (Hz) is plotted along the axis of the ordinate. As is shown in FIGS. 13 and 14, the driving frequency and driving voltage change smoothly in accordance with each other with a change in the injection quantity Q. This control can be easily performed.

Such control of the unit injector 2 is performed by the ECU 4. In response to the output signals from the sensors 31, 32, and 33, the ECU 4 determines a required injection quantity. Then the ECU 4 selects suitable driving voltage and driving frequency values from the graphs shown in FIGS. 13 and 14 and drives the unit injector 2 therewith.

Figure 15:
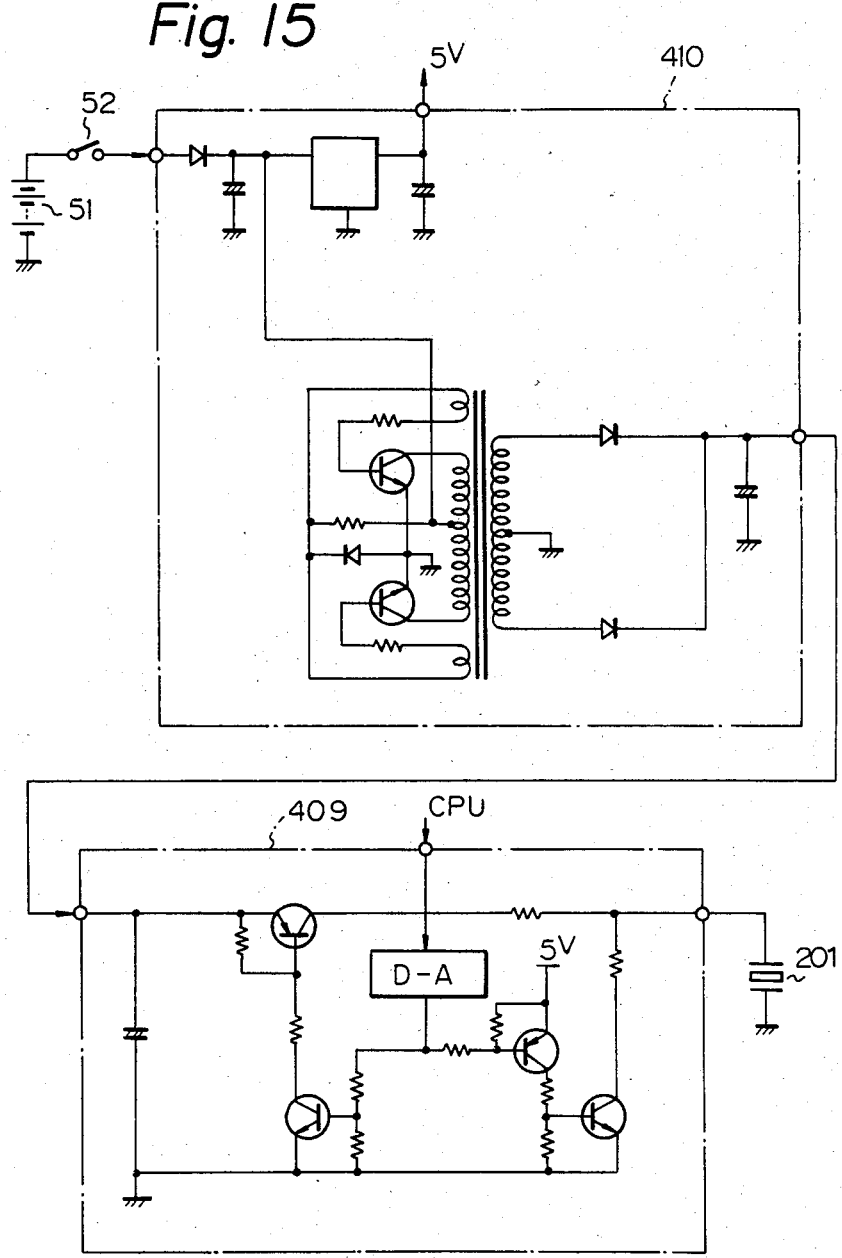
FIG. 15 is a circuit diagram of another example of a power source.

The power source 410 may comprise one which generates a voltage of +500 V by means of a DC/DC converter as is shown in FIG. 15. The driving circuit 409 may comprise a variable voltage control circuit which can adjust the voltage of +500 V within the range of 0 to 500 V as is shown in FIG. 15. The circuit converts the digital signal from the CPU 411 by means of a D/A converter into an analog signal of from 0 to 5 V and adjusts the output voltage thereby.

Figure 16B:
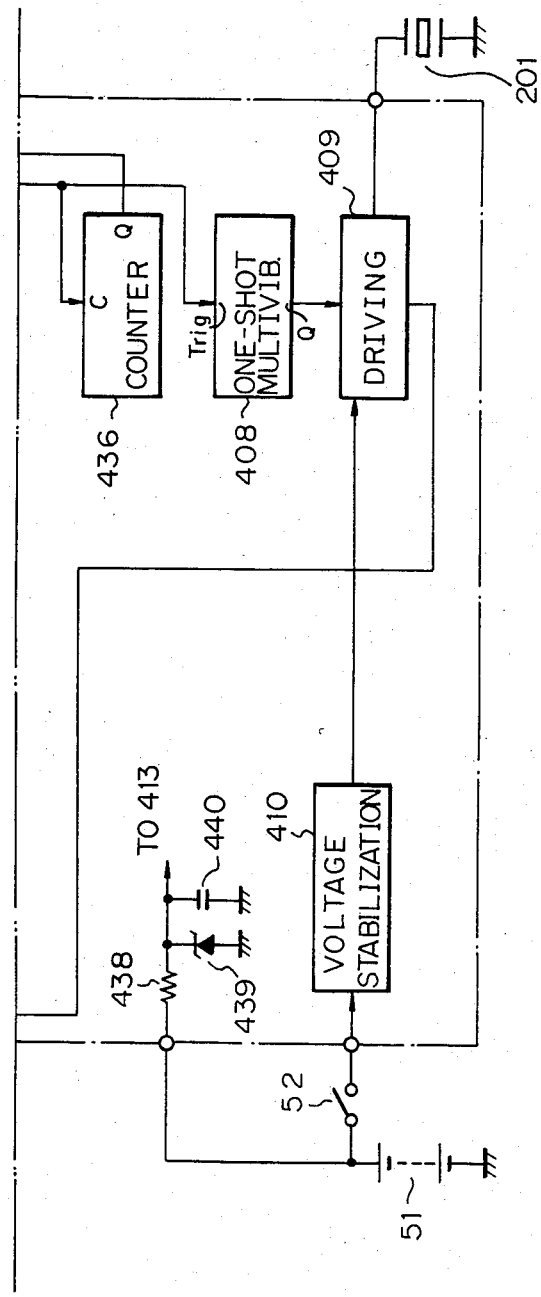

According to still another embodiment of the present invention, an ECU as is shown in FIG. 16 is used. The amount of expansion/contraction of the piezoelectric actuator may change in accordance with variations between piezoelectric actuators or changes in overtime. Such a change in the amount of expansion/contraction of the piezoelectric actuator results in a change in the injection quantity and, hence, in the air-fuel ratio A/F. However, when the ECU shown in FIG. 16 is used, the piezoelectric actuator is driven and controlled in such a manner that the integrated value of the intake air flow rate and the driving voltage of the piezoelectric actuator hold a predetermined relationship. Accordingly, the above-mentioned problem is resolved.

Only those features of the ECU shown in FIG. 16 which are different from those of the former embodiments will be described. Referring to FIG. 16, reference numeral 431 denotes a first integration circuit, and reference numeral 432 denotes a third A/D converter. An output signal from the first integration circuit 431 is A/D converted, and the digital signal obtained is supplied onto the bus line 414. A second integration circuit 433 integrates a driving current output signal from the driving circuit 409. When a reset signal supplied to a reset terminal R of the second integration circuit 433 is at level "1", its integration operation is initialized and an output therefrom is cleared to 0. A fourth A/D converter 434 A/D converts an output signal from the second integration circuit 433 into a 16-bit digital signal which is supplied onto the bus line 414. A 1-bit latch 435 latches an integration rest signal from the CPU 411 and produces it. The output of the latch 435 is connected to the reset terminals R of the integration circuits 431 and 433. A 500-base counter 436 receives at its clock terminal C a coincidence signal from the digital comparator 407. Every time the coincidence signal from the digital comparator 407 is received, the counter 436 produces one pulse of level "1". The pulse is supplied to an interrupt input INT4 of the CPU 411.

Stabilized power from the battery 51 is constantly supplied to the RAM 413 through a resistor 438, a Zener diode 439, and a capacitor 440 irrespective of the switch 52 so that data in the RAM 413 may not be lost. The clock signal $\phi 1$ is connected to the interrupt input INT2 of the CPU 411, the clock signal $\phi 2$ is connected to the interrupt input INT3, and an output from the 500-base counter 436 is connected to the interrupt input INT4. The priority order of interrupt is INT1, INT2, INT3, and INT4.

Figure 17:
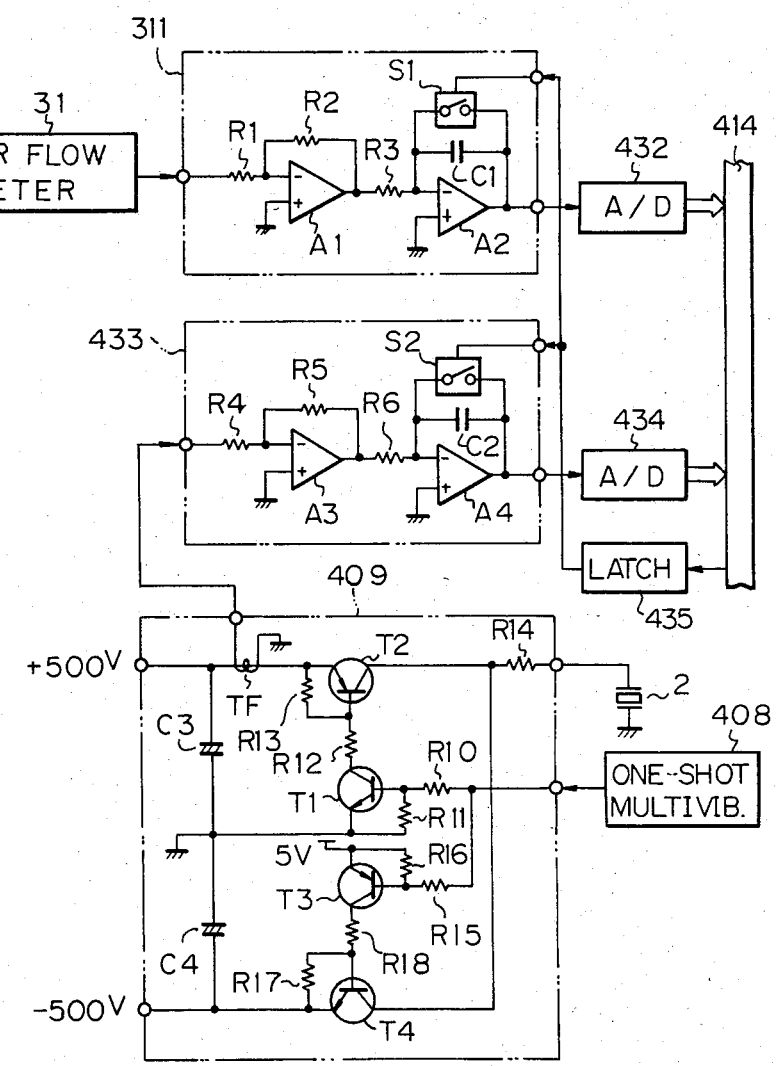
FIG. 17 is a circuit diagram of an integration circuit in the ECU shown in FIG. 16.

The integration operation will now be described. FIG. 17 shows the driving circuit 409, the first integration circuit 431, the second integration circuit 433, and the surrounding circuits. An operational amplifier A1 amplifies an output signal from the air flow meter 31 by a gain which is determined by resistors R1 and R2. In this embodiment, the gain is set to be $-1$. An operational amplifier A2 constitutes an integrator of a time constant which is determined by a resistor R3 and a capacitor C1. The operational amplifier A2 integrates the output signal from the operational amplifier A1. In this embodiment, the resistor R3 has a resistance of 21.71 k$\Omega$ and the capacitor C1 has a capacitance of 10 $\mu$F. An analog switch S1 electrically opens/closes; it closes when the control input is at level "1" so as to short-circuit the integrating capacitor C1 and to initialize the integrator. An ouptut signal from the first integration circuit 431 is connected to the third A/D converter 432.

The second integration circuit 433 serves as a circuit similar to the first integration circuit and amplifies the driving current output signal by a gain which is determined by resistors R4 and R5. In this embodiment, this gain is set to be $-1$. An operational amplifier A4 constitutes an integrator having a time constant which is determined by a resistor R6 and a capacitor C2. The operational amplifier A4 integrates the output signal from an operational amplifier A3. In this embodiment, the resistor R6 has a resistance of 5 k0 and the capacitor C2 has a capacitance of 1 μF. An analog switch S2 electrically opens/closes; it closes when the control input thereinto is at level "1" so as to short-circuit the integrating capacitor C2 and to initialize the integrated charge thereon. An output signal from the second integration circuit 433 is connected to the fourth A/D converter 434.

In the driving circuit 409, a voltage of +500 V is constantly stored on a capacitor C3 and a voltage of −500 V is constantly stored on a capacitor C4 by a constant voltage power source. These capacitors C3 and C4 are incorporated so that the power source voltage may not fluctuate due to surge power when the piezoelectric actuator is driven. When the driving signal from the one-shot multivibrator 408 is at level "1", a transistor T1 is turned on through resistors R10 and R11. The collector current of the transistor T1 turns on a transistor T2 through resistors R12 and R13. Then a voltage of +500 V is applied to flow a current to the piezoelectric actuator 201 through a constant current control resistor R14. In this embodiment, the resistor R14 is set at 20Ω. When the driving signal from the one-shot multivibrator 408 is at level "0", a transistor T3 is turned on through resistors R15 and R16. The collector current of the transistor T3 turns on a transistor T4 through resistors R17 and R18. A voltage of −500 V is applied so as to flow a current to the piezoelectric actuator 201 through the constant current control resistor R14. When the transistor T2 is turned on, the current flowing to the piezoelectric actuator 201 by the supplied voltage of 500 V is detected by a current transformer TF and is converted into a voltage signal to be coupled to the second integration circuit 433. In this embodiment, the characteristics of the current transformer TF are selected to be 10 A/V.

Figure 18:
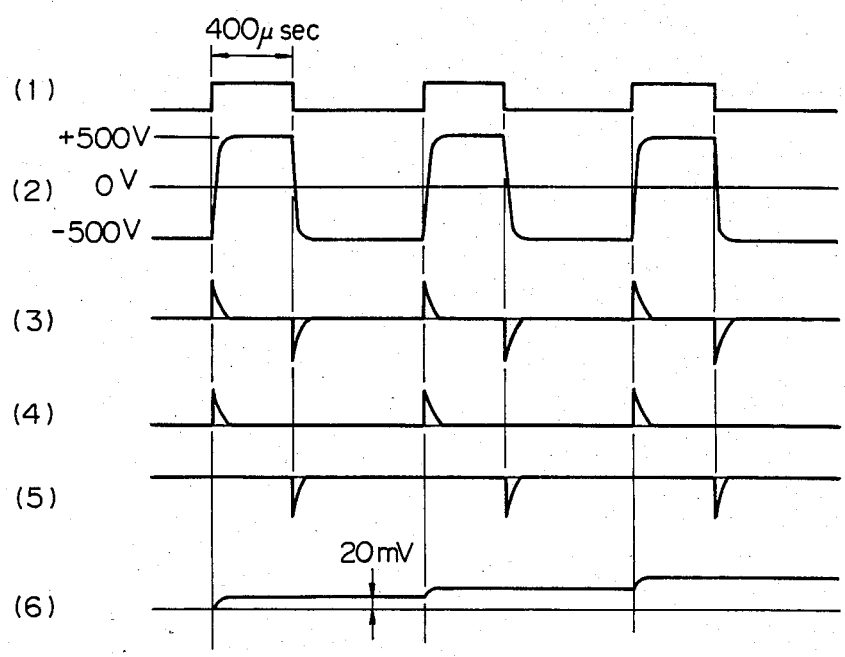
FIG. 18 shows the waveforms of signals at the respective parts of the integration circuit shown in FIG. 17.
Figure 19:
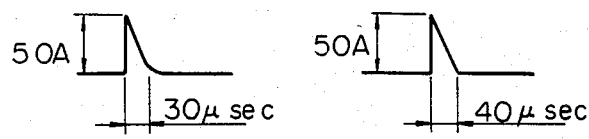
FIG. 19 shows in detail parts of the waveforms shown in FIG. 18.

FIG. 18 shows the waveforms of signals at the respective parts of the circuit shown in FIG. 17. Every time a driving signal (FIG. 18(1)) is received from the one-shot multivibrator 408, the driving circuit 409 generates driving voltages of +500 V and −500 V (FIG. 18(2)) so as to drive the piezoelectric actuator 201. At this time, a current having a peak current of 50 A as is shown in FIG. 18(3) flows to the piezoelectric actuator 201. FIG. 18(4) shows the charging current waveforms when a voltage of +500 V is applied to allow the pumping operation of the piezoelectric actuator 201. FIG. 19 shows the details of this waveform. The details of the waveform shown in FIG. 18(4) are the actual waveforms of the charging current on the left in FIG. 19. The time constant is determined by the constant current control resistor R14 and the capacitance (1.5 μF) of the piezoelectric actuator 201 and is 30 μsec. This is considered to approximate a triangular wave having a peak current of 50A and a duration of 40 μsec, as is shown on the right in FIG. 19. This current is converted into a triangular wave having a peak voltage of 50 V and a duration of 40 μsec by the current transformer TF.

The second integration circuit 433 integrates the driving current signal as is shown in FIG. 18(6). The signal is incremented by 20 mV in each integration operation. When the integration operation is repeated 500 times, a voltage of 50 V is obtained as the driving current integrated value.

Meanwhile, the first integration circuit 431 integrates an output signal (10 g/sec/V) from the air flow meter 31. In this case, assuming that the average air flow rate is x g/sec, the output voltage from the air flow meter 31 is 0.1×. Since the driving frequency is 18.4× Hz when the proportionality constant k=18.4 Hz/g/sec, the time required for performing 500 integration oprations is 500/18.4× sec. Thus, the final integrated value becomes 10 V.

When the piezoelectric actuator 201 expands/contracts for 50 μm upon the application of a voltage of ±500 V and fuel is injected in the amount of, for example, 5 mm³, the integrated driving current and the integrated air amount both become 10 V and the proportionality constant k can be 18.4 Hz/g/sec. If the amount of expansion/contraction of the piezoelectric actuator 201 is decreased for some reason (e.g., temperature change or time elapse) and the injection quantity is decreased accordingly, the driving current is decreased. Accordingly, the integrated driving current becomes less than 10 V. For example, when the amount of expansion/contraction of the piezoelectric actuator 201 is 40 μm and the injection quantity is 4 mm³, the peak driving current becomes 40A and the integrated driving current is decreased to 8 V. When the proportionality constant k remains 18.4 Hz/g/sec, the integrated air amount remains 10 V, and the proportionality constant k is multiplied by 10/8 to be corrected to 23.0 Hz/g/sec by the operation of CPU430. Thus, the integrated air amount value at the next operation timing coincides with the integrated driving current value, which results in the achievement of the correct correction.

When the amount of expansion/contraction of the piezoelectric actuator 201 is increased, the correction can also be carried out in a similar manner as described above. For example, when the integrated driving current value increases from 10 V to 12 V, the proportionality constant k is multiplied by 10/12 to be corrected to 15.33 Hz/g/sec. Thus, the air-fuel ratio A/F can be maintained at the stoichiometrical air-fuel ratio. The times of integration is selected as a large number 500, since it is necessary to detect the average variation of the value in order to eliminate the influence of the $O_2$ sensor feedback.

With regard to the proportionality constant k, the correction by k is possible if the step of the calculation "F×p" in the first subroutine (FIG. 7B) is replaced by the step of the calculation "F×k×p". That is, the proportionality constant k which has been obtained in the fourth subroutine described later is read, and then the correction coefficient p is read and the corrected frequency is obtained by mutliplying the fundamental frequency F by the read correction coefficient P.

Finally, the obtained frequency is converted into the period or the pulse number T of the clock signal φ2 for the binary counter 406. The data T is latched in the latch 405 and the flow returns to the MAIN routine. Thereafter, the digital comparator 407 compares the output t from the binary counter 406 with the contents T of the latch 405. When t≧T, the comparator 407 automatically produces a driving signal. The driving signal is converted into voltages of ±500 V by the driving circuit 409 is used to drive the piezoelectric actuator 201.

Figure 20:
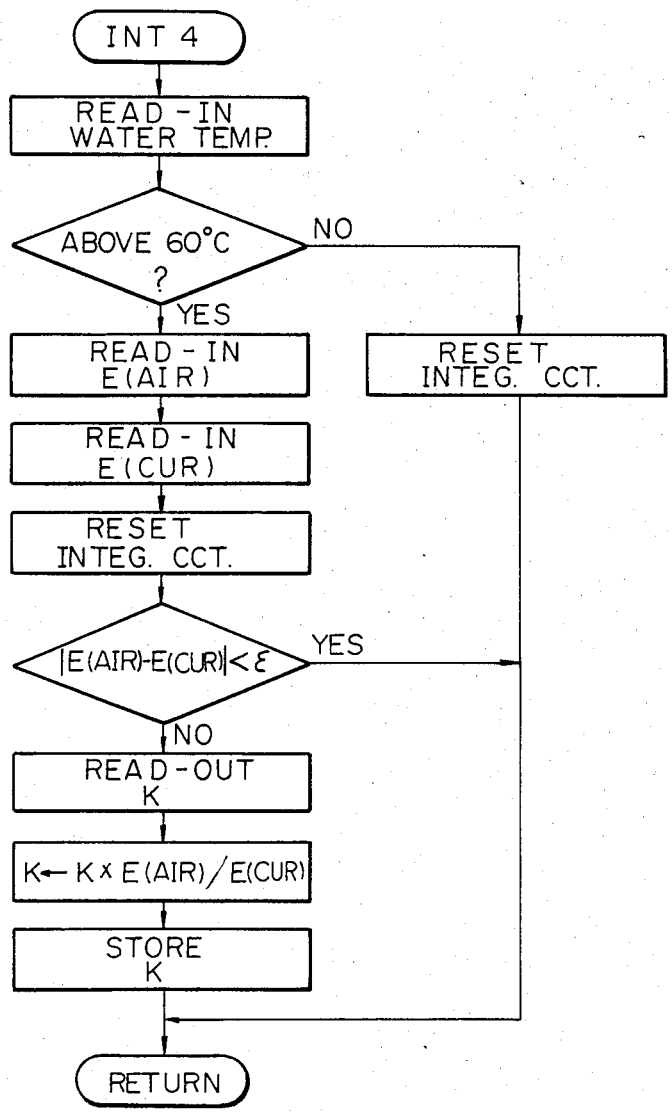
FIG. 20 is a flow chart of the operation of the system when the ECU shown in FIG. 16 is used.

The fourth subroutine shown in FIG. 20 will now be described. The fourth subroutine has the lowest priority order corresponding to INT4 and is started every time the driving signal is produced 500 times. The water temperature data is read in from the second A/D converter 402. It is then checked if the water temperature is 60° C. or higher. If the water temperature is 60° C. or higher, the following processing is performed. The integrated air amount E(Air) is read in from the third A/D converter 432. Next, the integrated driving current E(Cur) is read in from the fourth A/D converter 434. Thereafter, the reset signal for the integrating capacitor of the latch 435 is produced for the next integration operation. The integrated air amount E(Air) and the integrated driving current E(Cur) are compared with each other. If the absolute value of the difference between these two integrated values is less than a predetermined constant ϵ, the proportionality constant k need not be changed and the flow returns to the MAIN routine. If the value E(Air) is larger than the data E(Cur), this means that the injection quantity is small with respect to the intake air flow rate. Thus, the proportionality constant k is corrected. The proportionality constant k may be corrected by multiplying E(Air)/E(Cur) by k or by incrementing the constant in increments of 5%. In any case, E(Air) and E(Cur) converge to coincide so as to maintain the air-fuel ratio at the theoretical air-fuel ratio. On the other hand, if the value E(Air) is smaller than E(Cur), the proportionality constant k is similarly corrected. The corrected proportionality constant k is stored in the RAM 413 and the flow returns to the MAIN flow. The proportionality constant k updated in this manner is used for calculation of the fundamental frequency in the first subroutine shown in FIG. 7B. Since the RAM 413 has backup power, the contents stored in the RAM 413 may not be lost even if the power is turned off. After the second correction or updating of the proportionality constant k, the preceding result may be used, thus providing a learning effect. When the water temperature is lower than 60° C., the air-fuel ratio A/F is not identical to the theoretical air-fuel ratio. Therefore, the proportionality constant k is not corrected in the manner described above, and initialization of the integration circuits alone is performed. The flow then returns to the MAIN routine.

In this manner, the proportionality constant k is corrected at predetermined intervals in accordance with the relationship between the integrated driving current and the integrated air amount. Accordingly, the fundamental frequency for attaining the theoretical air-fuel ratio can be constantly obtained.

Figure 21:
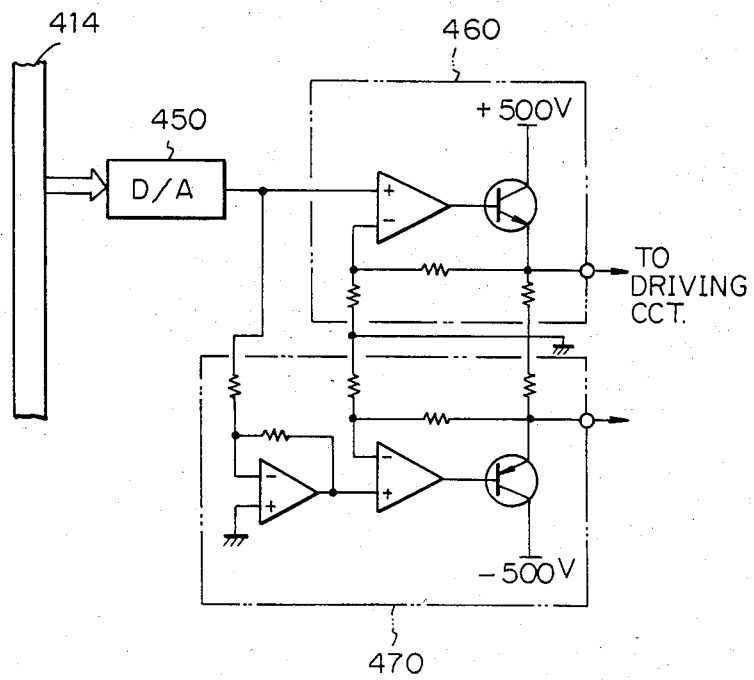
FIG. 21 is a circuit diagram showing another embodiment wherein the ECU shown in FIG. 16 is used.

The mode of operation of the ECU shown in FIG. 16 has been described with reference to a case wherein the integrated driving current and the integrated air amount are compared with each other and the driving frequency is changed so that the integrated driving current and the integrated air amount coincide with each other. However, the driving voltage may be corrected instead of correcting the frequency. FIG. 21 shows a case wherein the driving voltage is changed. In this case, when the value E(Air) is larger than E(Cur), the CPU 411 sets the preceding value of the ratio E(Air)/E(Cur) in a D/A converter 450. An output from the D/A converter 450 is converted into voltages ±50 times the original value by stabilizers 460 and 470, which voltages are then supplied to the driving circuit 409. When the value E(Air) is smaller than E(Cur), the output to the D/A converter 450 is decreased to lower the driving voltage, thereby decreasing the injection quantity.

Alternatively, the driving current itself may be set as a constant current, and the constant current or conduction time may be changed for correction.

In the present invention, as was described above, the amount of expansion/contraction of a pressure actuator such as a piezoelectric actuator is indirectly detected by the integrated driving current, and the detected amount is controlled to hold a predetermined relationship with the integrated intake air amount. Accordingly, even if the characteristics of the actuator change, the air-fuel ratio can be constantly controlled with high precision.

When the integration time is determined by the number of driving operations, a substantially constant final integrated value can be obtained independently of the engine conditions. Then degradation in the detection precision of the sensors is prevented. If the integration time is set to be sufficiently longer than the feedback period of the $O_2$ sensor, the pulsation of the air-fuel ratio A/F by the feedback from the $O_2$ sensor can be averaged and changes in the air-fuel ratio A/F can be reliably detected.

We claim:

1. A fuel injection system for an internal combustion engine comprising:
   a unit injector for compressing the fuel and injecting a predetermined amount of the fuel, said unit injector including an actuator adapted to be expanded or compressed with a predetermined stroke in response to a supplied voltage, a piston for taking in fuel to a pump chamber and compressing said taken-in fuel, and an injection valve for injecting said compressed fuel; and
   electronic control means for controlling, independently of the rotation of the engine, the frequency of the voltage supplied to said actuator and controlling accordingly the amount of fuel injection in accordance with the frequency of the voltage supplied to said actuator.

2. A fuel injection system according to claim 1, wherein said actuator is a piezoelectric actuator.

3. A fuel injection system according to claim 2, wherein said unit injector comprises an upper casing having a substantially cylindrical shape, a nozzle body having a nozzle, a needle valve arranged in said nozzle body so as to be slidingly movable in said nozzle body, and a distance piece arranged between said nozzle body and said upper casing, said piezoelectric actuator and said piston being arranged in said upper casing, the pressure of the supplied fuel exerting a valve closing force of said needle valve and the pressure of the compressed fuel from said pump chamber exerting a valve opening force of said needle valve.

4. A fuel injection system according to claim 3, wherein a fuel path for supplying fuel to said pump chamber is formed in said upper housing, a path connected to said fuel path is formed in said distance piece, and a check valve is arranged in said path formed in said distance piece.

5. A fuel injection system according to claim 4, wherein a ball is contained in said check valve and a projection for clamping said ball is formed in said piston.

6. A fuel injection system according to claim 2, wherein said electronic control means comprises regulation means for regulating said voltage supplied to said actuated for regulating the stroke of said piezoelectric actuator, said voltage supplied to said actuator being regulated in such a manner that the frequency of said voltage is within a predetermined range of frequency.

7. A fuel injection system according to claim 6, wherein said regulation means includes a power source for producing voltages of different values and a switching means for switching said voltages of different values.

8. A fuel injection system according to claim 6, wherein said regulation means includes a voltage-changing means for changing successively said voltage supplied to said actuator.

9. A fuel injection system according to claim 2, wherein said system comprises an air flow sensor for sensing the flow rate of air supplied to the engine, said electronic control means being adapted to change the frequency of the voltage supplied to said actuator in response to the signal from said air flow sensor.

10. A fuel injection system according to claim 9, wherein said electronic control means is adapted to control the voltage supplied to said piezoelectric actuator in response to the signal from said air flow rate sensor in such manner that a predetermined relationship is maintained between the integrated amount of air and the integrated amount of driving of said piezoelectric actuator during a predetermined length of time.

* * * * *